Dec. 12, 1961  S. R. STILES  3,013,093
ALKYLATION PROCESS
Filed March 20, 1957  2 Sheets-Sheet 1

FIG. 1

INVENTOR.
SAMUEL R. STILE
BY
J. H. Palmer
Carl D. ———
ATTORNEY
AGENT

Dec. 12, 1961 S. R. STILES 3,013,093
ALKYLATION PROCESS
Filed March 20, 1957 2 Sheets-Sheet 2

FIG. 2

INVENTOR.
SAMUEL R. STILE
BY
*D. H. Palmer*
ATTORNEY
*Carl D. Farnsworth*
AGENT

United States Patent Office 3,013,093
Patented Dec. 12, 1961

3,013,093
ALKYLATION PROCESS
Samuel R. Stiles, Creeskill, N.J., assignor to The M. W. Kellogg Company, Jersey City, N.J., a corporation of Delaware
Filed Mar. 20, 1957, Ser. No. 647,339
9 Claims. (Cl. 260—683.62)

This invention relates to an alkylation process. In one aspect, this invention relates to the alkylation of isoparaffins with olefins in the presence of an acid catalyst to produce hydrocarbon compounds boiling in the gasoline boiling range. In another aspect, it relates to a method of decreasing contamination or fouling of the alkylation process equipment due to the decomposition of contaminants contained in the alkylation effluent.

In the alkylation of isoparaffins with olefins in the presence of an acid catalyst, a partial control of the production of high-boiling polymers and esters formed during the alkylation reaction is provided by carrying out the alkylation reaction in such a manner that a large excess of isoparaffins is always present in the reaction zone. In addition, reaction conditions of temperature, pressure, acid concentration, etc., when closely controlled, also tend to promote the alkylation reaction and diminish side reaction. In spite of these precautions, however, acid, esters and high-boiling polymers are produced in the alkylation reaction and these materials are present in varying amounts in the hydrocarbon effluent stream leaving the alkylation reactor.

Esters produced in the alkylation of isoparaffins with olefins in the presence of sulfuric acid are soluble both in the hydrocarbon mixture leaving the reaction zone and in the acid catalyst and act as contaminants in both streams. The polymers while soluble in the hydrocarbon phase are essentially insoluble in the acid catalyst, however, a substantial portion of these materials fail to separate from the catalyst during the relatively short settling time provided in the alkylation reactor. As a result, the withdrawn acid stream is contaminated with both esters and polymers. Purification of this material, however, is a problem requiring special consideration and as such is beyond the scope of this invention and will not be considered herein.

The polymers in the alkylation effluent are primarily high molecular weight, high-boiling compounds with relatively low octane numbers and are generally unsatisfactory as a blending material for the production of high-octane gasoline. The acid and neutral esters are also relatively high-boiling materials and they too are lower in quality than the alkylate as a whole. Fortunately, one of the properties which contributes to the undesirability of the polymers and esters in high-octane gasoline is their tendency to boil at higher temperatures, which makes it possible to concentrate them by conventional fractionation. These lower octane materials may be easily collected in a so-called heavy alkylate product, which is generally small in quantity compared to the more desirable alkylate which is designated as "light alkylate."

It has been found that most of the esters, both acid and neutral, are unstable to heat and decompose at elevated temperatures. It is possible that at high temperatures at least some of the olefin polymers formed in the alkylate zone may also decompose, contributing to the carbonaceous deposits. Although esters and polymers are present in all the streams leaving the alkylation reactor, the problem of decomposition is not acute except where high concentrations of these materials exist or their decomposition temperatures exist. This is generally the last step in the conventional alkylation process and involves the highest temperature, thereby creating conditions conductive to the decomposition of esters and polymers.

In the prior art alkylation processes attempts to reduce the fouling of reboilers in the product separating equipment resulted in operating the towers at lower temperatures and pressures, which necessitated the use of expensive auxiliary equipment, such as vacuum equipment to operate the rerun tower below atmospheric pressure. This, however, has not been completely satisfactory since the reboilers employed in the debutanizer and particularly the rerun towers have had to be periodically replaced because of the deposits fouling the reboilers resulting in inefficient operation. These conditions have been a source of worry to refiners for many years and they have materially increased the cost of alkylation units.

It is an object of this invention to provide an improved alkylation process.

It is another object of this invention to reduce the degree of fouling of equipment employed in the alkylation process.

Still another object of this invention is to effectively remove the contaminants found in the alkylation effluent.

A further object of this invention is to provide an alkylation process which may efficiently separate the products of reaction into desired components under normal operating conditions.

These and other objects of the invention will become more apparent from the following detailed description and disclosure.

This invention relates to the improved method of treating the contaminated hydrocarbon effluent stream obtained from an alkylation reaction. In carrying out this invention, the hydrocarbon effluent stream contaminated with acid, esters and high-boiling polymers from the alkylation reactor is passed to an acid-coalescer-separator to remove entrained acid. The hydrocarbon effluent separated from the acid coalescer containing less entrained acids is then subjected to a water washing treatment employing elevated temperatures, vigorous agitation and an excess of the washing agent. Generally the water washing of the contaminated alkylation effluent stream is conducted in one or more washing zones or stages employing water alone, however, in the event that the acid-coalescer-separator is bypassed and/or a substantial amount of acid contaminants is entrained in the alkylation hydrocarbon effluent, the effluent may be washed first with an aqueous caustic solution to neutralize and remove the acid contaminant prior to washing with water alone, in accordance with this invention. When employing the aqueous caustic wash, generally a 5 to 20 percent caustic solution is employed, most usually about a 10 percent caustic solution. In any event, the water washing with or without the addition of caustic is conducted at elevated temperatures of from about 100° F. to about 400° F., preferably from about 120° F. to about 180° F. The water washed hydrocarbon effluent stream is then passed to a water-coalescer-separator for removal of entrained water and remaining contaminants, which have been identified as hydrolyzed salts, prior to separating the hydrocarbon effluent stream into desired components in the processing equipment. The water-coalescer-separator is maintained at a temperature in the range of from about 90° F. to about 150° F., while employing a pressure of from about 130 to about 150 p.s.i.g.

In discussing the application of this invention, it is desirable to consider a specific alkylation reaction. For this reason and because of its wide spread use, the subsequent discussion is directed to the reaction of isobutane with butylene in the presence of sulfuric acid. This, however, is not to be construed in any way as limiting the scope of this invention as it may apply also to the reaction of isobutane with propylene, amylene and di-isobutylene.

In the commercial alkylation of low-boiling isoparaffins with olefins, it is customary to utilize feed stocks varying widely in composition and containing a large variety of saturated and unsaturated compounds. For example, either cracked or straight run refinery gases which are a prime source of alkylation feed stocks and may contain normal paraffins having from 1 to 6 carbon atoms and isoparaffins, including isopentane, isobutane and others of higher molecular weight and numerous low-boiling olefins and their isomers. It is within the scope of this invention to use feed stocks containing gas and higher boiling compounds in widely varying proportion.

The sulfuric acid alkylation of specific materials such as isobutane with butylene is preferably conducted in several stages and at a temperature between about 0° F. and about 100° F., preferably from about 35° F. to about 70° F. The pressure in the reaction zone is maintained at a level sufficient to keep the reactants substantially in a liquid phase, usually between about atmospheric and about 100 p.s.i.g., preferably from about 6 p.s.i.g. to about 15 p.s.i.g. In order to obtain a high quality alkylate, it is desirable to maintain a high isobutane to olefin ratio at the point where olefin feed is introduced to the reaction stages, preferably about 2 and about 4000 moles per mole, and it is necessary to keep the acid catalyst strength above 80 percent and preferably above 90 percent. Sufficient acid concentration to promote the alkylation reaction is provided by maintaining an acid to olefin ratio in each reaction stage of between about 0.25 and about 30 volumes of acid per volume of olefins per hour.

In a typical application of this invention, isobutane and sulfuric acid are introduced into an alkylation reaction zone and are violently agitated to form an emulsion, this being the preferred method of assuring intimate contact between the acid catalyst and the hydrocarbon to be alkylated. Butylene may be added with the isobutane to the reaction zone or separately to each stage of the reaction zone, as hereinafter described. The major portion of the isobutane feed is provided by a recycle stream obtained from subsequent distillation steps. Additional quantity of isobutane required is obtained from an independent source, such as catalytic reformer gas. The mixing and agitating required in the contact zone of the alkylation reactor may be provided in a number of ways, however, usually a conventional mixer or pump provides the means for creating and moving the emulsion at high velocity and also for circulating the emulsion in the separate contact zone. The reaction may be carried out in one stage, although more usually several stages in series are provided with a portion of the olefin reactant being admitted to each stage and contacting isobutane passed serially through each successive stage. The alkylation feed which contains the olefin reactant, such as butylene, also contains isobutane, butane, propane, isopentane, pentane and frequently small quantities of lighter paraffins. The temperature in the reaction zone is maintained at a constant low level by vaporizing therefrom a portion of the lighter components in the reactants or reaction products, more usually a mixture of butane, isobutane, propane and any other low-boiling components. The vapors are compressed and condensed and the condensate after the removal of propane and lighter components is returned to the alkylation zone in the isobutane recycle stream.

The effluent from the last contactor reaction section is passed to a separation zone wherein contaminated acid containing some polymers and acid esters is separated from the hydrocarbons by settling. A portion of the separated acid catalyst containing contaminants is recycled with fresh acid to the contactor or reactor and the remainder is either processed to remove contaminants and reused, or else it may be used in a treating process wherein a high degree of acid purity is not required or the contaminated acid may be discarded from the process.

The hydrocarbon material remaining after separation of the major portion of the acid comprises a mixture of alkylate, unconverted isobutane, other low-boiling paraffins, unconverted butylene, polymers, acid and esters. The alkylation effluent contaminated with acid and esters is removed from the alkylation reactor separator and passed to an acid-coalescer-separator wherein entrained acid is removed from the hydrocarbon effluent. The acid-coalescer-separator employed in the process of the present invention may be of the impingement type or electrical type. A typical impingement type coalescer is one packed with alternate transverse layers of knitted stainless steel wire mesh, herring bone type and vinyl coated fiber glass with a density of approximately three pounds per cubic foot. A typical electric static precipitate, which may be employed, is one to which may be applied from about 10,000 to 100,000 volts, preferably from about 30,000 to about 60,000 volts and of extremely low amperage of about 2.5 milliamps. The acid coalescer is generally operated at a temperature of from about 20 to about 200° F., preferably from about 30 to about 100° F., and a pressure sufficient to maintain the effluent in liquid phase of from about 5 to about 300 p.s.i.g. The thus treated hydrocarbon effluent contaminated with esters and containing a lesser amount of acid not removed by the acid coalescer is then passed to a water-wash treatment hereinbefore described. In accordance with one embodiment, the contaminated hydrocarbon effluent separated from the reactor acid coalescer is combined with caustic solution ranging in strength from about 2 percent to about 10 percent by weight sodium hydroxide and the mixture of hydrocarbon effluent and caustic solution is violently agitated or mixed by suitable means such as a mixing valve operated with a pressure drop of from about 10 pounds to about 100 pounds, preferably from about 10 pounds to about 45 pounds. The mixture is then passed to a separating drum or settler at an elevated temperature of about 100° F. to about 400° F., preferably about 100° F. to about 180° F. and a pressure of about 50 to about 200 p.s.i.g., in which drum an upper purified hydrocarbon layer and a lower aqueous layer are formed. The caustic treatment neutralizes the acid and acidic material carried over from the acid coalescer. The caustic wash also serves to saponify a portion of the ester contaminants. The contaminated caustic solution is then removed from the lower portion of the settler and may be recycled to the mixing valve with the addition of fresh caustic, as desired. When the caustic solution becomes spent or unsatisfactory for further use, it is removed from the process. The upper hydrocarbon effluent layer separated from the caustic wash in the settling drum is then passed to a water-wash step. In the water-wash step, the hydrocarbon layer is mixed or combined with water and this mixture is violently agitated by suitable means such as a mixing valve operated with a pressure drop of from about 10 to about 100 pounds, preferably from about 10 to about 45 pounds, to violently agitate the mixture, which is then passed to a suitable separator or settling drum at a temperature of between about 100° F. and 400° F., preferably from about 120° F. to about 180° F., at a pressure of from about 50 to about 200 p.s.i.g. to separate an upper layer of hydrocarbon and a lower layer of water. Water which is withdrawn from the lower portion of the settling drum may be mixed with fresh water and re-used or withdrawn from the process depending on the extent of contamination. The water withdrawn from the settler was found to have a pH of from about 7 to about 8. The hydrocarbon layer separated from the water wash which had a cloudy appearance, is then passed to a second coalescer called water-coalescer-separator for removal of water and hydrolyzed salts. The water-coalescer may be of the impingement or electrical type as previously described with respect to the acid coalescer. Water removed from the water-coalescer was found to have a pH of from about 1 to about 2. One explanation for this is that neutral esters or salts remaining in the hydrocarbon layer were hydrolyzed. Examination of the hydrocarbon layer separated from the water-coalescer was water white and failed to show the presence of any contaminants, as determined by a flask residue test. The presence of heat decomposable contaminants or carbon catalyzing material in the hydrocarbon effluent passed to the acid coalescer was substantiated by distilling to dryness a sample of the effluent stream which left a brownish and/or black material in the bottom of the flask. A hydrocarbon sample taken after water treatment and following the water-coalescer when distilled to dryness failed to show any deposits in the flask. This recovery of a substantially water-white contaminant free alkylation hydrocarbon effluent permitted operating the product recovery equipment, particularly the rerun tower under more efficient distillation conditions, which included higher temperatures and pressures without fouling of the reboiler with carbonaceous or resinous deposits, corrosion of towers and auxiliary equipment from decomposition products, or requiring expensive auxiliary vacuum equipment to operate the rerun tower at pressures below atmospheric pressure, as previously required. Generally, the coalescers will be operated at a temperature in the range of from about 20 to about 200° F. and a pressure in the range of about 50 to about 300 p.s.i.g.

In another embodiment of this invention, the alkylation effluent is treated with a hot water-wash, in one or more stages, without the caustic wash previously described. In this embodiment, the hydrocarbon effluent separated from the acid coalescer contains minor amounts of acid contaminants, less than about 100 p.p.m. (parts per million) acid esters. The contaminated effluent containing esters and a minor amount of acid is then washed with water alone in one or more stages or treating zones in the manner and under the conditions described hereinbefore, with respect to the caustic water wash without preliminary treatment with aqueous caustic solution. The hydrocarbon effluent separated from the last water wash is then passed to the water-coalescer for removal of entrained water in the manner hereinbefore described.

The method of operation provided by this invention has several important advantages as indicated hereinbefore. By virtually eliminating the contaminants which tend to decompose at elevated temperatures, particularly in the reboilers, eliminated a maintenance problem of long standing, which in commercial units has resulted in many hours of lost production, in addition to excessive maintenance expense.

In order to more clearly define the invention and to provide a better understanding thereof, reference is had to the attached drawings in which.

Figure 1:
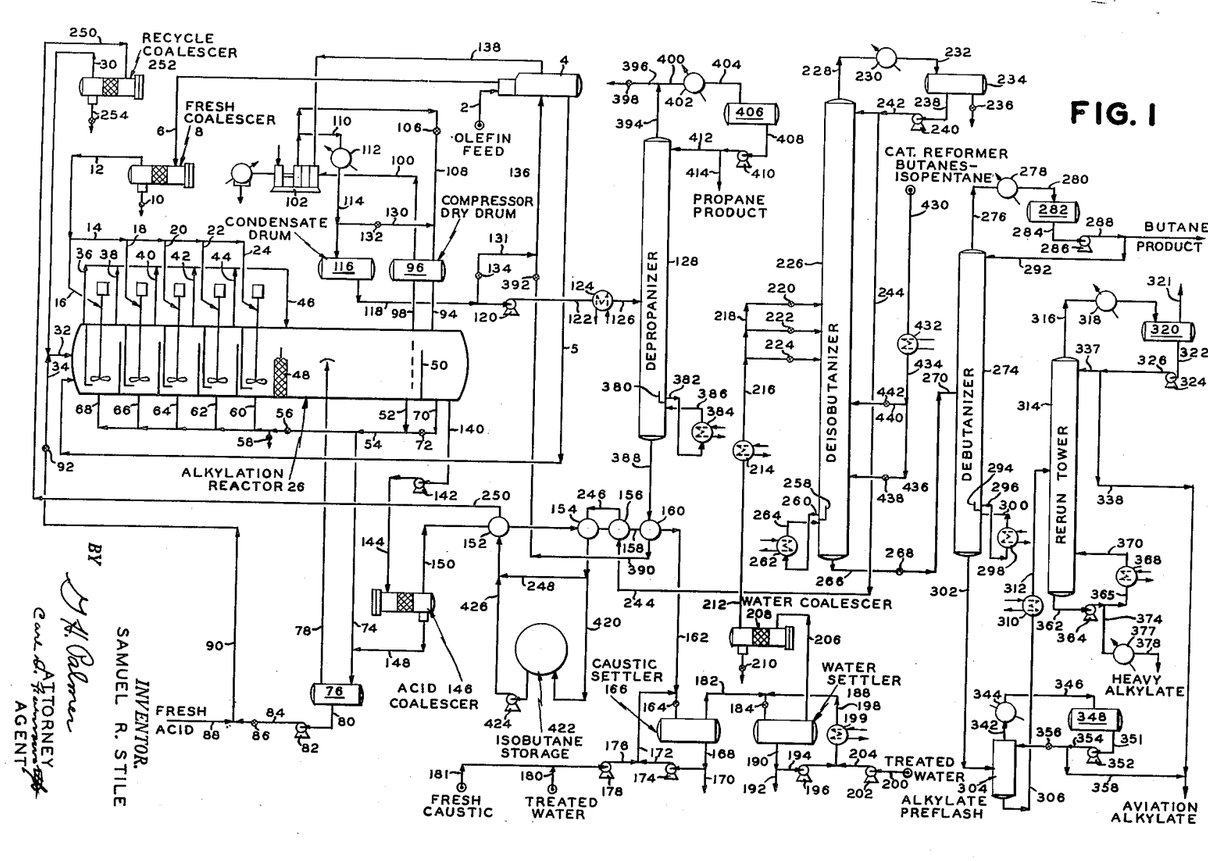
FIGURE 1 is a diagrammatic illustration in elevation of the process equipment arrangement used in one embodiment of the invention.

Referring to FIGURE 1 of the drawings, the alkylation reactions are carried out in an elongated cylindrical contactor or reaction vessel 26. The interior of approximately two-thirds of the reactor is divided into a number of separate reaction stages. By a plurality of transfer baffles appropriately arranged, the liquid entering the left end of the reactor passes from the inlet chamber upwardly through the first section over a baffle and down to the bottom of the second section, then upwardly through the second section over a second baffle and in a similar manner through the remaining sections of the reactor. Each section contains a mixer M1, M2, M3, M4, M5 respectively in this specific illustration, impeller type submersible pumps disposed vertically with the impellers located in the lower portion of each reaction section. Each pump is so constructed that material entering the section is forced upward within the casing surrounding the impeller into the corresponding section. The capacity of each pump is such that the quantity of material circulated through the pump is several times greater than the total liquid flow entering the section in which the pump is located. By this method of operation it is possible for example to provide an isobutane to butylene ratio of more than 200 to 1 in the mixers with a feed ratio in each reaction section of only about 20 to 1.

The alkylation reactants and catalyst enter the contactor 26 at different points. The alkylation feed comprising a mixture of propane, butane, isobutane and butylene is divided into a plurality of streams for entering the mixing pumps through conduits 16, 18, 20, 22 and 24 respectively. This material passes downwardly within each pump through a hollow sleeve surrounding the pump shaft and is admitted to the liquid stream flowing through the pump down stream of the pump impeller at the point of maximum emulsion flow velocity. A mixture of butane and isobutane made up of compressor condensate material, wet isobutane separated from the reactor effluent in the isobutane tower and fresh isobutane is admitted to the first chamber of reactor 26 through conduit 32. Acid catalyst comprising fresh acid or a mixture of fresh acid and contaminated acid in an amount sufficient to provide an acid to olefin ratio of about 4 volumes of acid per volume of olefin per hour in each reaction section is passed by conduit 34 and combined with the recycle stream in conduit 30 prior to entering the reactor by conduit 32 in order to absorb any water contained in this hydrocarbon recycle stream. As illustrated, a portion of the acid may alternately be introduced into all or any one of the reaction sections through conduits 60, 62, 64, 66 and 68. Hydrocarbon passing from the inlet chamber into the first reaction section containing mixer M1 is combined with the acid and the mixtures entering the suction side of the pump where it is picked up, emulsified and directed upwardly within the pump casing at a high velocity. The alkylation feed in conduits 16, 18, 20, 22 and 24 is admitted to the emulsion down stream of the pump impeller and the alkylation reaction proceeds immediately and is substantially completed before the mixture leaves the pump casing. As mentioned previously, the capacity of the pump is sufficiently great to assure a circulation rate several times as large as the flow of alkylation feed, isobutane and acid into the reaction section. Thus unreacted isobutane is circulated along with the acid catalyst and a portion of the alkylation product is passed through a pump a number of times before it leaves or passes into the next section where another portion is reacted with the fresh alkylation feed. This same procedure is repeated in each successive section of the reactor.

Simultaneous with the alkylation reaction, quantities of neutral and acid esters, as well as polymers, are formed. Some of these are relatively simple in structure, however, the majority of them are much more complex and have molecular weights substantially higher than the desirable compounds formed in the alkylation reaction.

The liquid reaction mixture containing isobutane alkylate acid, ester and polymer contaminants leaves the last contact section and passes through an emulsion breaking zone 48 formed by parallel transfer baffles and containing an inert packing material such as inert refractory material, Berl saddles, Raschig rings, etc., or knitted wire mats comprising from about 40 to about 200 wire screens of the open weave type. The wire used in forming the mats may be of stainless steel or any other material non-corrosive in the alkylation system. Other suitable materials which may be used for forming the mats are glass cloth, glass wool, polyethylene, etc. The wire used for forming the mats may vary in size ranging from about 0.001 inch in diameter to as large as about 0.1 inch in diameter. All of the effluent from the last section is forced to flow through this emulsion breaking zone by a baffle imposed thereupon extending above the liquid level within the contactor or reactor and downward within the emulsion breaking zone. The material passes through the emulsion breaking zone to a separator or settling zone wherein the acid separates from the hydrocarbon layer. The settling zone is enclosed by baffle 50 and emulsion breaker 48. The hydrocarbon layer flows over the top of baffle 50 into the remainder of the contactor from which it is withdrawn. The separated acid containing polymers and esters passes or is withdrawn from the reactor 26 by conduit 52. In the event any acid passes over into the remaining section of the reactor, the acid layer may be withdrawn by conduit 70 containing valve 72. A portion of this acid may be recycled to the reaction portion of the reactor and admitted to each section thereof by conduit 54 containing valve 56 and a plurality of inlet conduits identified as 60, 62, 64, 66 and 68. The remaining portion of the withdrawn acid is passed to an acid decanter 76 by conduit 74. Hydrocarbon products are withdrawn from the decanter 76 and returned to the reactor through conduit 78 and the decanted acid is withdrawn by conduit 80 containing pump 82, passed by conduit 84 containing valve 86 to acid recycle line 90 containing valve 92. A portion of this acid may be combined with fresh acid introduced through conduit 88 and the mixture is added to the recycled isobutane in conduit 30 prior to entering the reactor, as previously described. Spent acid may be withdrawn from the system by conduit 58.

The alkylation reactor 26 is maintained at a temperature of about 35° F. and a pressure of about 6 p.s.i.g. The alkylation reaction is highly exothermic and it is necessary to provide a method of cooling the reactor to remove the heat of reaction and the sensible heat in the feed stream and thereby maintain the reaction sections at the required low temperature. In this specific illustration the cooling is accomplished by an auto-refrigeration system. In carrying out this process, vapors comprising a mixture of isobutane, butane and propane are withdrawn from the reactor by conduit 94 into a dry drum 96. Any material settling out in the dry drum is returned to the reactor settling section beneath the acid level through conduit 98. The dry gas removed from dry drum 96 by conduit 100 enters the inlet section of the compressor 102. The dry gas is compressed and discharged from the compressor by conduit 104. A portion of the gas is passed by conduit 110 to a conventional water cooler 112 and passed to a condensate drum 116 by conduit 114. Another portion of this compressed material may be withdrawn by conduit 104 containing valve 106 and conduit 108 to dry drum 96, or a portion of the gas in conduit 114 may be diverted by conduit 130 containing valve 132 to conduit 108 and passed to dry drum 96. The material collected in compressor condensate drum 116 is withdrawn by conduit 118 and divided into two parts with a portion being sent to the depropanizer 128 by conduit 122 containing pump 120 and heat exchanger 124 and then through conduit 126 to the intermediate portion of the depropanizer tower 128. The remainder is passed by conduit 132 containing valve 134 and conduit 136 to a heat exchanger-flash drum combination 4 and then returned to the compressor by conduit 138. Liquid cooled by auto-refrigeration in heat exchanger-flash drum 4 may be withdrawn by conduit 5 and returned to the first section of reactor 26. Fresh feed introduced by conduit 2 is passed in heat exchange with the cool compressed products in heat exchanger 4, withdrawn by conduit 6 and passed to a fresh feed coalescer 8. Water contained in the feed separated by coalescer 8 is withdrawn by conduit 10 from the coalescer and the feed is then passed by conduit 12 to the reactor as hereinbefore described. It is desirable to proportion the condensed compressor effluent stream so as to maintain a controlled concentration of light materials in the contactor or alkylation reactor. By this means it is possible to obtain the desired reactor temperature with a compressor section. A certain amount of vaporization which occurs in the reactor 26 takes place in the entrance chamber and the reaction sections previously described. The isobutane recycle stream enters the reactor as liquid and at a higher temperature and pressure than exists within the reactor, for example, about 50° F. and about 40 p.s.i.g. As a result, a portion of this stream flashes in the entrance chamber of the reactor. To prevent a mixture of vapor and liquid from passing into the suction of pump M1, an outlet for this gaseous material is provided through conduit 36. A similar vapor conduit is provided for each reaction section. In order to remove the reaction heat from each section, it is necessary that a further amount of light material be vaporized therein. This material is supplied from the circulating refrigerant entering the reactor from conduit 5 and flows in normal manner as a liquid from previous reactor compartments. Some of this refrigerant may also come from the alkylation feed from conduits 16, 18, 20, 22 and 24, which feed is also introduced at an elevated temperature and pressure of about 50° F. and about 40 p.s.i.g., which is substantially higher than exists in the reactor. The vapors so formed are removed from each section through conduits 36, 38, 40, 42 and 44 combined in conduit 46 and returned to the settling section of the reactor. This material is then withdrawn from the reactor by conduit 94, as previously described. By this method of operation it is possible to maintain a relatively constant, as well as uniform temperature throughout the reactor 26. In depropanizer tower 128 operated in a temperature range of about 100 to about 180° F. and a pressure of about 85 p.s.i.g., a propane-rich fraction is taken overhead from the depropanizer tower through conduit 394, a portion of this material may be removed from the process by conduit 396 containing valve 398 and passed to fuel gas, the remaining portion is passed by conduit 400 through conventional heat exchanger 402 and conduit 404 into an accumulator 406. Accumulator liquid is then withdrawn by conduit 408 containing pump 410 and returned to the top of the tower as reflux by conduit 412. The remainder of the liquid may be withdrawn from the unit by conduit 414 as propane product. Heat is supplied to the bottom of the depropanizer tower by conventional reboiler. A portion of the liquid separated in trap 380 is withdrawn by conduit 392, passed to a suitable heat exchanger or reboiler 384 and returned to the bottom of the depropanizer tower by conduit 386 at the desired temperature. The bottoms fraction comprising primarily isobutane with some butane passed from the bottom of the depropanizer through conduit 388, gives up a portion of its heat in heat exchanger 160 to the alkylation effluent and is passed to heat exchanger-flash drum 4 by conduit 390 containing valve 392 and conduit 136.

The hydrocarbon alkylation effluent stream and any unreacted alkylation reaction feed contained therein is withdrawn at a rate of about 20,300 b.p.s.d. or 180,000 pounds per hour from the alkylation reactor 26 by conduit 140 containing pump 142 and passed to an acid-coalescer 146 by conduit 144. The acid-coalescer 146, described hereinbefore, removes additional acid from the alkylation effluent stream, which is withdrawn by conduit 148 and passed to the acid decanter 76, as previously described. The hydrocarbon layer separated in the acid-coalescer 146 is withdrawn by conduit 150 and passed through conventional heat exchangers 142, 154 and 156, wherein the temperature of the stream is raised to about 82° F. The hydrocarbon effluent is then passed from heat exchanger 156 at a temperature of about 82° F. by conduit 158 to heat exchanger 160 to further raise the temperature thereof to about 120° F. The thus heated hydrocarbon effluent stream is passed by conduit 162 to a suitable water-washing step in accordance with the invention. In the embodiment shown in FIGURE 1, the warmed hydrocarbon effluent stream is combined with a 10 percent caustic solution introduced by conduit 172 and passed through a mixing valve 164 to provide intimate contact between the caustic solution and the hydrocarbon effluent. Mixing valve 164 is operated with a pressure drop of about 45 pounds. The thoroughly mixed or combined stream is then passed to a caustic settler 166 wherein acid and acidic material carried over from the acid-coalescer is neutralized by the caustic and separated from the hydrocarbon effluent by settling. The caustic wash also serves to saponify a portion of the ester contaminants. The hydrocarbon effluent passed to the caustic settler 166 is maintained at an elevated temperature of about 140° F. by suitable heat exchange means and a pressure of about 160 p.s.i.g., sufficient to keep the effluent in liquid phase. Contaminated caustic is removed from the lower portion of the settler by conduit 168 and may be recycled at a rate of about 5800 b.p.s.d. for admixture with additional hydrocarbon effluent feed by pump 174 and conduit 172. Additional fresh caustic may be added by conduit 180, pump 178 and conduit 176, on a continuous or semi-continuous basis with the concentration of the caustic solution controlled by hot water and/or steam which may be added through conduit 180. Spent caustic may be removed from the settler by conduits 168 and 170. The ratio of hydrocarbon effluent to aqueous caustic solution is about 3 to 1 or 10 to 1 depending on the strength of the caustic solution employed and the quantity of acid and/or acid esters present. The thus neutralized hydrocarbon layer is withdrawn from caustic settler 166 by conduit 182, combined with hot water between 160° and 250° F. in a ratio of between about 1 part water to about 1 part hydrocarbon or about 1 part water to about 5 parts hydrocarbon, depending on the type and quantity of neutral esters to be hydrolyzed, and introduced by conduit 198 to a mixing valve 184 and conduit 186 to water settler 188. Mixing valve 184, provided to give intimate contact between the hydrocarbon effluent stream and water, is operated with a pressure drop of about 20 pounds.

Water contacted with the hydrocarbon stream to hydrolyze the neutral esters is heated by passing through heat exchanger 199 in conduit 198. Part of this water is recirculated water from the drum and part fresh water introduced by conduit 200 required to replace that water withdrawn by conduit 192 to remove the acid product by hydrolysis of the neutral esters. The pH of the recirculated water should be maintained above 6.0 pH by injecting the fresh water at a pH of about 7.0–8.0. The temperature of the combined recirculated and fresh water should be maintained from about 160° to about 250° F., as required to heat the hydrocarbon stream to a temperature of from about 130° to about 160° F.

The hydrocarbon effluent passed to the water settling drum 188 is maintained in this manner at a temperature of about 160° F. and at a pressure of about 145 p.s.i.g. In settling drum 188 the water separated from the hydrocarbon effluent may be removed by conduits 190 and 192 from the process or a portion of the separated water may be recycled at a rate of about 5800 b.p.s.d. through the heater 199 to the mixing valve 184 by conduit 194 containing pump 196 and conduit 198. Fresh water may be added as described above, to the system by conduit 200 containing pump 202 and conduit 204 connected to conduit 198. The hydrocarbon effluent stream washed with water alone at the elevated temperature is withdrawn from water-washed settler 188 by conduit 206 and passed to a water-coalescer 208, as previously described. In coalescer 208 any entrained water and hydrolyzed contaminants remaining in the hydrocarbon effluent are separated by settling from the hydrocarbon effluent and withdrawn from the bottom of the coalescer by conduit 210. A purified alkylation hydrocarbon effluent stream is recovered from the water-coalescer, which is water white in appearance (clear of any water haze) and free of decomposable contaminants. The purified hydrocarbon effluent removed from the coalescer by conduit 212, is passed through a conventional heat exchanger 214 wherein the temperature of the hydrocarbon stream is increased to above 160° F. to vaporize a portion of this stream before going to the fractionator towers and then passed by conduit 216 to the deisobutanizer tower 226. Heat exchanger 514 may be eliminated if desired. The acid-free hydrocarbon effluent passed to the deisobutanizer (DIB) tower 226 is separated to recover isobutane, which is removed overhead through conduit 228, condensed in condenser 230 and passed by conduit 232 at a temperature of 120° F. and a pressure of about 87 p.s.i.g. for collection in accumulator 234. A portion of the condensed material is returned by conduit 238 containing pump 240 and conduit 242 to the upper portion of the DIB tower as reflux at a rate of about 36,400 b.p.s.d. Any water separated in accumulator 234 resulting from water dissolved in the effluent stream may be withdrawn by conduit 236. The remainder of the recovered isobutane stream is discharged through conduit 244, at a rate of about 14,800 b.p.s.d., passed through heat exchanger 156, conduit 246 and heat exchanger 154 in heat exchange with the hydrocarbon effluent stream from the alkylation reactor, as previously described. The isobutane stream separated from heat exchanger 154 may be passed to isobutane storage 422 by conduit 420, or may be passed by conduit 248 to conduit 426, then through heat exchanger 152 and returned to the alkylation reactor by conduit 250, coalescer 252 and conduit 30 at a rate of about 14,000 b.p.s.d. Coalescer 252 may be similar to the acid-coalescer previously described or, since water essentially free of acid is removed, can contain a coalescing media more efficient for removing water of 6.0–7.5 pH. Any entrained water separated from the isobutane recycle in coalescer 252 may be withdrawn by conduit 254. In one embodiment, a portion of isobutane is passed through conduit 248 continuously with the remaining portion being passed by conduit 420 to storage or surge drum 422. By this arrangement, any change in the isobutane requirements of the alkylation process may be compensated by drum 422 by supplying the isobutane through conduit 426. The heat required to vaporize the isobutane in tower 226 is supplied by conventional reboiler 262. That is, liquid is withdrawn from trap 258 in the lower portion of the DIB tower by conduit 260, passed through reboiler 262 and returned to the bottom of the tower by conduit 264 to supply the necessary heat thereto. In supplementing the isoparaffin feed requirements of the process from other sources, such as a catalytic reformer, this isoparaffin containing feed is passed by conduit 430 through heat exchanger 432 and conduit 434 to the lower portion of the DIB tower at a temperature of about 170° F. Provisions are made to introduce this fraction at one of various points of the tower by conduit 436 containing valve 438 and conduit 440 containing valve 442. The choice of feed location depends on isobutane content of this stream. The lower the isobutane content, the lower the feed point. Generally, this material will be introduced to the tower between plates 5 and 20 from the bottom of a 60 plate column, whereas the alkylation effluent will be introduced to the DIB tower between plates 35 and 50 from the bottom. The bottoms from the DIB tower comprising a mixture of butane and alkylate products is withdrawn at a rate of about 8,500 b.p.s.d. and passed through conduit 266 to debutanizert tower 274 at an elevated temperature of about 200° F. to 250° F., depending on the ratio of butane to alkylate content. The pressure is reduced between DIB tower 226 and debutanizer tower 274 by valve 268 in conduit 266. The debutanizer tower is operated at a temperature in the range of from about 110° F. to about 320° F., and a pressure of about 75 p.s.i.g. Butane products recovered in the upper portion of the tower are removed by conduit 276 to condenser 278 and passed by conduit 280 to accumulator 282, operated at a temperature of about 100° F. and a pressure of about 65 p.s.i.g. A portion of the condensed material is recycled as reflux to the top of the tower by conduit 284 containing pump 286, conduits 288 and 292 at a rate of about 7,000 b.p.s.d. with the remainder being withdrawn as product of the process by conduit 290. The heat required for operating the debutanizer tower 274 is provided by a conventional reboiler in a lower portion of the tower. Liquid is withdrawn from trap 294 by conduit 296, passed through reboiler 298 and returned to the lower portion of the tower by conduit 300.

Up to the point of introducing the hydrocarbon effluent to the debutanizer tower, the operating conditions, particularly the temperatures have been such that there was no particular need to be concerned with heat decomposition of entrained contaminants to resinous or carbonaceous deposits since the temperature employed have been below decomposition temperatures. Generally, the most extreme temperature conditions encountered in the recovery equipment is in the debutanizer reboiler and the rerun tower reboiler. In prior practice the temperatures in the lower portion of the debutanizer tower have been kept at a level not exceeding about 270° F., while the temperature in the rerun tower is maintained at a maximum of about 300° F., and operated at a pressure below atmospheric pressure. Under these conditions of operation, however, there was still an appreciable deposit of the contaminants contained in the alkylation effluent passed to these towers for separation. By applicant's improved water treating step, the contaminants tending to decompose at temperatures below about 300° F. have been substantially, if not completely removed, thereby providing an effluent stream which may be more efficiently separated at higher temperatures and pressures than previously employed in the prior art.

The alkylate recovered from the bottom of the debutanizer tower at a rate of about 6,300 b.p.s.d. is passed by conduit 302 to a flash drum wherein a portion of the lower boiling alkylate referred to as "light alkylate" is flashed overhead. The overhead "light alkylate" stream amounts to about 40 percent of the total quantity of this material. The alkylate leaving the top of the flash drum passes through conduit 342 to condenser 344 and conduit 346 into a reflux accumulator 348. Liquid withdrawn from the accumulator 348 by conduit 350 containing pump 352 is divided into two streams with a portion being returned to the flash drum through conduit 354 containing valve 356 and the remainder being recovered as light alkylate through conduit 358 at a rate of about 1,900 b.p.s.d. Generally the flash drum is operated at a temperature of about 197° F. and a pressure of about 5 p.s.i.g. with the heat required to accomplish the flash operation being supplied by reducing the pressure of the hot high pressure alkylate stream removed from the bottom of the debutanizer tower by conduit 302. Although the concentration of high-boiling polymers and traces of esters present leaving the bottom of the flash drum are increased by the flash operation, little or no decomposition takes place in this vessel under the conditions of operation.

The remaining alkylate recovered from the lower portion of the flash drum still contains a large amount of low-boiling, light alkylate, high-octane materials which are passed by conduit 306 at a rate of about 4,300 b.p.s.d. to heater 310 wherein the temperature of the alkylate is raised up to about 270° F. and into rerun tower 314 by conduit 312. In the rerun tower 314, a further separation is made to separate a light alkylate from a heavy alkylate. In accordance with one embodiment of the present invention, the rerun tower may now be operated at higher temperatures under atmospheric pressure conditions or slightly above atmospheric pressure, say from atmospheric to about 20 p.s.i.g., since substantially all of the decomposable contaminants contained in the alkylation effluent stream have been removed, as previously described. Generally the rerun tower will be operated in a temperature range of from about 375° F. to about 420° F., at the pressure conditions recited above. The remaining light alkylate separated in the rerun tower 314 is removed from the top of the rerun tower by conduit 316 to a condenser 318 and then into accumulator 320 at a temperature of about 100° F. and atmospheric pressure. Vent 321 is provided to vent the accumulator to the atmosphere. The total liquid recovered in the accumulator is removed therefrom by conduit 322 containing pump 324 and divided into two streams. A portion of this material at a ratio of about 1,700 b.p.s.d. is used to reflux the rerun tower through conduit 337. The remaining portion of the recovered light alkylate, about 4,000 b.p.s.d., in conduit 338 is combined with the flashed "light alkylate" recovered in conduit 358 and the combined product removed as a "light alkylate" product of the process. The heavy alkylate is withdrawn by conduit 362 from the bottom of the tower containing pump 364 and divided into two streams. A portion of the withdrawn heavy alkylate is passed to a suitable reboiler 368 by conduit 366 to raise the temperature thereof and returned to the lower portion of the rerun tower by conduit 370 to provide the necessary heat thereto. The remaining portion of the heavy alkylate is withdrawn by conduit 374 at a rate of about 350 b.p.s.d., passed to condenser 377 and recovered as a heavy alkylate product of the process by conduit 378.

Figure 2:
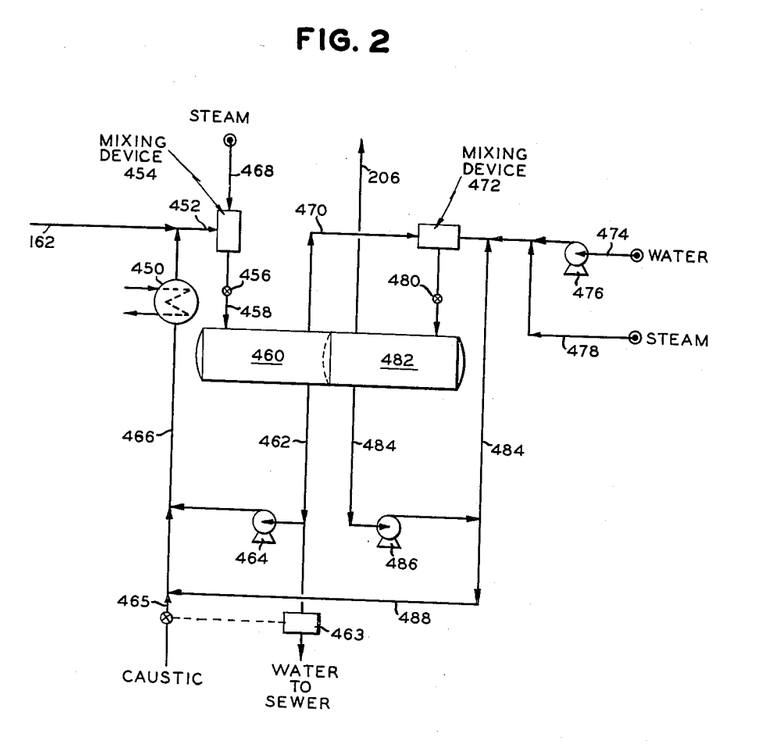
FIGURE 2 is a diagrammatic illustration in elevation of another embodiment of the invention.

FIGURE 2 is a diagrammatic illustration in elevation of another embodiment of the water treating process of the present invention. In this embodiment, the hydrocarbon effluent separated from the acid-coalescer, as shown in FIGURE 1, is passed by conduit 162 and mixed with hot water at a temperature of about 160° to 250° F., from conduit 466 such that the temperature of the hydrocarbon effluent is raised to a temperature of about 130° F. to about 160° F. The thus heated hydrocarbon effluent and water is passed by conduit 452 to mixer 454. Steam may be added to mixer 454 by conduit 468 to raise the temperature of the hydrocarbon effluent to above 140° F. The thus heated hydrocarbon effluent combined with steam and recycled hot water is then removed from mixer 454 and passed to mixing valve 456 operated with a pressure drop of about 10 to about 45 pounds. Passing of the combined and heated water-hydrocarbon effluent stream through mixing valve 456 provides vigorous agitation and intimate contact of the water-hydrocarbon effluent mixture, which is then passed by conduit 458 to separator 460. In separator 460, hydrocarbon effluent is separated from contaminated water by settling. The contaminated water to be removed from the process is withdrawn from the bottom of separator 460 by conduit 462 containing a pH controller 463 connected to a valve in caustic inlet conduit 465. A portion of the contaminated water may be recycled through conduit 464 containing a pump and conduit 466. Any free acid or acid ester passing through coalescer 146 in FIGURE 1 will be trapped in this water. Caustic may be added to the recirculated water to hold the pH of the water between about 6.0 and 7.0 pH. The flow of caustic charged to the circulated water may be regulated by a pH recorder or indicator controller 463. The hydrocarbon effluent separated in separator 460 is removed by conduit 470 and passed to mixing device 472. Hot water is added to mixing device 472 by conduit 474 containing pump 476. Hot water may be obtained from any sources such as cold water heated by steam by direct contact is shown, hot steam condensate sent direct to system without further heating or cooling (not shown) or cold water heated by indirect heat exchange (not shown). In any event sufficient heat is added to maintain the temperature of the water-hydrocarbon effluent stream at about 130°–160° F., generally about 140° F., with sufficient amount of water added to maintain a water to hydrocarbon ratio of between 1 part hydrocarbon to 1 part water or 1 part hydrocarbon to 10 parts water. The combined water-hydrocarbon effluent mixture is then passed to mixing valve 480 operated with a pressure drop of about 10 to about 45 pounds and then to separator 482, wherein the hydrocarbon effluent is separated from the water by settling. Contaminated water is withdrawn from the bottom of the separator by conduit 484 containing pump 486 and a portion may be recycled to mixing device 472 by conduit 484. The remaining portion of the water is passed by conduit 488 to the first stage of the water wash and combined with the hydrocarbon effluent in conduit 452 as previously described. The hydrocarbon effluent separated in separator 482 is removed and passed by conduit 206 to water-coalescer 208 for removal of entrained water as hereinbefore described in connection with FIGURE 1. While a mixing device and mixing valve are shown separately in this embodiment, it is to be understood that they may be combined in a single unit or the mixing device alone or mixing valve alone may be used.

The following data presents the results of an investigation conducted and the conditions employed in a typical commercial application of this invention.

EXAMPLE

Flow:

| | Lb./hr. |
|---|---|
| Alkylation effluent | 179,139 |
| DIB tower bottoms | 82,053 |
| Debutanized alkylate | 63,706 |
| Rerun tower feed | 44,684 |
| Light alkylate from flash drum | 19,022 |
| Total light alkylate product | 59,617 |
| Heavy alkylate | 4,089 |
| Ratio of light to heavy alkylate | 14.6 |

Temperatures:

| | °F. |
|---|---|
| Caustic wash | 140 |
| Water wash | 140 |
| Water coalescer | 140 |
| DIB tower bottoms | 195 |
| Debutanizer bottoms | 310 |
| Flash drum | 254 |
| Rerun tower: | |
| Top | 260 |
| Bottoms | 400 |

Pressures:

| | P.s.i.g. |
|---|---|
| Caustic wash (pressure drop) | 160 |
| Water wash (pressure drop) | 145 |
| Water coalescer | 145 |
| DIB tower | 105 |
| Debutanizer tower | 65 |
| Flash drum | 5 |
| Rerun tower | 5 |

As a result of this investigation, a simple "flask test" has been developed into a reliable tool for process and operational control of the caustic water-wash treating system or two-stage water-wash treating system.

Types of fouling obtained from weathered reactor effluent, plant debutanized total alkylate, light alkylate and heavy alkylate samples where various operating conditions were investigated revealed that four distinct types of fouling were present. The materials causing each type of fouling have been identified and can be removed in accordance with the present invention.

Type I fouling

Organic acids decompose when heated from about 270° F. to about 320° F. to form carbon deposits in the upper part of the flask. If these organic acids are present in the fractionating towers, carbon will deposit wherever temperatures above 270° F. are obtained.

Type II fouling

Neutral esters cause a carbon type deposit at high temperatures as shown by a lighter spot in the bottom of the flask where high film temperatures are obtained as the distillation approaches dryness. Eventually sulfate compounds promote cracking reactions. A dense fog occurs in the distillation flask when these conditions are obtained. This fog is absent in the flask where this type fouling is absent. Type II fouling is significant of rerun, reboiler fouling or wherever high film temperatures are present on the heating surface. Forced circulation through the rerun reboiler exchange unit or furnace decreases the fouling rate of this type by reducing the film temperature.

Type III fouling

Water soluble sulfates present in a water phase in the reactor effluent stream causes dark granular type deposits in the flask. This type deposit has been duplicated by adding a few parts per million of potassium sulfate to isooctane and distill. Free sulfuric acid will also form this type deposit. This type deposit will be found in rerun tower reboilers or any other place where high skin temperature occurs.

Type IV fouling

The fourth type of fouling deposit has been identified by the formation of a ring just before the dry point is reached and appears to be typical of the presence of inert solids or salts which deposit when liquid is evaporated.

Reactor effluent samples were drawn from two different commercial alkylation units identified as A and B for investigation. Samples of the caustic and water-wash vessel outlet of each unit were quite hazy with suspended water and showed an apperciable quantity of Type III deposit when distilled. When the water haze was removed by a coa'escer the Unit B Type III deposits disappeared. Furthermore, examination of the flask revealed that there was very little fouling material of any type in the flask. Unit A effluent from caustic and water-wash was clarified by filter paper to remove the water haze and Type III deposits disappeared. However, Type II fouling was found to be prevalent in Unit A plant effluent whereas it was absent in Unit B effluent. This difference was attributed to the intensity of water washing. At Unit B similar conditions to Unit A effluent is present when only 10 percent of water make-up was used, but with water make-up increased to 20 percent, Type II fouling virtually disappeared.

Experiments were conducted at Unit A to investigate the effect of water-washing temperature and mixing intensity. Weathered effluent from both the caustic wash and raw untreated effluent were washed with water at 140° F. with good mixing. Hot water wash effectively removes esters and settles rapidly even without prior caustic treatment. Cold water forming oil in water emulsion which settles slowly and complete hydrolysis of esters is not obtained. This data indicates that hot water-wash treatment is very effective for removing the fouling materials and that the caustic treatment is not essential but may be effectively employed to remove acidic material entrained in the reactor effluent.

Although the preceding data and discussion relates to preferred embodiments of this invention, it is intended that the scope of the invention shall not be limited thereby, but that it include other processing methods and equipment well known to those skilled in the art. As an example of an alternate method of operation, it is within the scope of this invention to bypass the flash drum 304 and passing the total alkylate product recovered from the bottom of the debutanizer tower in conduit 302 to the rerun tower for separation of the light alkylate from the heavy alkylate product. Also it is intended that the invention not be restricted in any way by the particular alkylation process scheme disclosed hereinabove.

Having thus described the invention by reference to a specific application thereof, it is understood that no undue limitations or restrictions are to be imposed by reason thereof.

What I claim is:

1. An improved method for treating an alkylation effluent contaminated with acid and esters, obtained from an alkylation reaction in the presence of sulfuric acid, which comprises passing said effluent to an acid coalescing zone for removal of a major portion of acid contaminant, withdrawing a less contaminated alkylation effluent vigorously agitating said contaminated alkylation effluent with a dilute caustic solution at a temperature between about 100° F. and 180° F., by passing a mixture thereof through a mixing valve operated with a pressure drop of from about 10 pounds to about 45 pounds, separating contaminated caustic from said mixture, separating a caustic treated alkylation effluent from said treating step, mixing said caustic treated alkylation effluent with water at a temperature of between about 120° F. and about 180° F., passing the water-alkylation effluent mixture through a second mixing valve operated with a pressure drop of from about 10 pounds to about 45 pounds, passing said water-alkylation effluent mixture to a separation zone at a temperature between about 120° F. and about 180° F., separating contaminated water from said water separating zone, separating a water treated alkylation effluent from said water separating zone, passing said separated water treated alkylation effluent to a water coalescing zone at a temperature of from about 90° F. to about 150° F., recovering an acidic water stream from said water coalescing zone, recovering a water-free alkylation effluent from said water coalescing zone and passing said water-free alkylation effluent directly to a distillation zone for recovery of pure alkylate product.

2. An improved method for removing acid and ester contaminants from an alkylation effluent obtained from the alkylation of an isoparaffin with an olefin in the presence of sulfuric acid; an alkylation process, which comprises passing said effluent through an acid coalescing zone to remove a major portion of the acid contaminant, mixing said contaminated alkylation effluent with water, passing said mixture at a temperature of from about 120° F. to about 180° F. through a mixing device operated at a pressure drop of from about 10 to about 100 pounds, to violently agitate said mixture, separating said mixture in a settling zone into an alkylation effluent layer and a water layer, recovering said water layer, neutralizing a portion of said recovered water layer and recycling the same to said mixing device, recovering said alkylation effluent layer, admixing said recovered alkylation effluent layer with additional hot water to maintain the temperature of said water-alkylation effluent mixture from about 130° F. to about 160° F., passing said hot water-alkylation effluent mixture to a second mixing device operated at a pressure drop of from about 10 to about 100 pounds, separating said mixture in a second settling zone into an alkylation effluent layer and a water layer, recovering said water layer from said second settling zone, passing a portion of said water recovered from said second settling zone to said first mixing device and passing the remaining portion of said water to said second mixing device, recovering alkylation effluent from said second settling zone, thereafter passing said water-washed alkylation effluent to a water-coalescer zone to remove entrained water from said alkylation effluent and recovering alkylation effluent free of water, acid and ester contaminants from said water-coalescer.

3. In a sulfuric acid alkylation process wherein an alkylation reactor effluent is passed to a coalescing zone to separate the sulfuric acid phase from the hydrocarbon alkylation effluent phase and wherein the separated hydrocarbon alkylation effluent contains a minor proportion of entrained sulfuric acid and sulfate ester contaminants, the improved method for treating the separated alkylation effluent which comprises in combination: passing said separated contaminated alkylation effluent to an acid-coalescer-separator zone, in said acid-coalescer separating zone separating a major portion of said contaminants from said alkylation effluent, recovering alkylation effluent from said acid coalescer, treating said recovered alkylation effluent with water in a plurality of alternate treating and settling zones under a pressure at which liquid phase conditions are maintained and at an elevated temperature of from about 120° F. to about 180° F., recovering an alkylation effluent stream from the last of said treating and settling zones and passing the same to a water-coalescer zone, in said water-coalescer zone maintained at a pressure of between about 130 p.s.i.g. and about 150 p.s.i.g., separating water from said alkylation effluent stream at a temperature of between about 90° F. and about 150° F. and recovering a purified alkylation effluent stream from said water coalescer.

4. In a sulfuric acid alkylation process wherein an alkylation reactor effluent is passed to a first coalescing zone to separate the sulfuric acid phase from the hydrocarbon alkylation effluent phase and wherein the separated hydrocarbon alkylation effluent contains a minor proportion of entrained sulfuric acid and sulfate ester contaminants, the improved method for treating the separated alkylation effluent which comprises in combination: passing said alkylation effluent through a second coalescer to separate a major portion of said contaminants by impingement on said coalescer, washing the coalesced alkylation effluent with water, under a pressure at which liquid phase condtions are maintained and under conditions of vigorous agitation and at a temperature of between about 120° F. and about 180° F., allowing the mixture to settle into an aqueous phase and a hydrocarbon alkylation effluent phase, withdrawing the water washed alkylation effluent and passing said effluent through a third coalescing zone which is maintained at a temperature of between about 20° F. and about 200° F. and withdrawing an alkylation effluent free of water, acid and ester contaminants from said third coalescing zone.

5. In a sulfuric acid alkylation process wherein an alkylation reactor effluent is passed to a coalescing zone to separate the sulfuric acid phase from the hydrocarbon alkylation effluent phase and wherein the separated hydrocarbon alkylation effluent contains a minor proportion of entrained sulfuric acid and sulfate ester contaminants, the improved method for treating the separated alkylation effluent which comprises in combination: passing said alkylation effluent through a second acid coalescer to separate a major portion of said acid and ester contaminants, washing said alkylation effluent with water under a pressure at which liquid phase conditions are maintained, and under conditions of vigorous agitation, induced by a mixing device operated at a pressure drop of not less than 10 pounds and at a temperature of between about 100° F. and about 180° F., passing the water washed alkylation effluent through a water coalescing zone which is maintained at a temperature of between about 20° F. and about 200° F. and withdrawing alkylation effluent free of water, acid and ester contaminants from said water coalescing zone.

6. An alkylation process which comprises reacting an olefin with an isoparaffin in the presence of a sulfuric acid catalyst under alkylating conditions in an alkylation zone, recovering alkylation effluent contaminated with acid and esters, passing said contaminated effluent to an acid coalescer separator at a temperature of from about 20° F. to about 200° F. to separate a major portion of entrained acid contaminant from said alkylation effluent by impingement, allowing the resulting mixture to settle, recovering and passing said treated alkylation effluent directly to a caustic treating zone wherein the effluent is washed with a caustic solution at a temperature of from about 120° F. to about 180° F. to neutralize and saponify entrained acid and ester contaminants remaining in said alkylation effluent, recovering and passing the neutralized alkylation effluent to a water washing zone wherein the effluent is washed with water under conditions of vigorous agitation, under a pressure drop of not less than about 10 pounds and at a temperature of between about 120°

F. and about 180° F., recovering and passing said water washed effluent through a water coalescing zone which is maintained at a temperature between about 90° F. and about 150° F., recovering a water-white alkylation effluent from said water coalescing zone, directly passing said water-white alkylation effluent from said water coalescing zone to a distillation zone for removal of paraffinic hydrocarbons therefrom, passing the deparaffinized alkylation effluent to a flashing zone wherein a light alkylate fraction is separated as a product of the process from a heavy alkylate fraction, passing said heavy alkylate fraction to a fractionation zone wherein an additional light alkylate fraction is separated from a heavy alkylate fraction, and recovering said heavy alkylate fraction and light alkylate fractions as products of the process.

7. In an alkylation process wherein an isoparaffin is reacted in a reactor with an olefin in the presence of sulfuric acid, the reactor effluent is passed to a separation zone in which the sulfuric acid phase is separated from the hydrocarbon alkylation effluent phase and wherein the separated hydrocarbon alkylation effluent contains a minor proportion of entrained sulfuric acid and sulfate ester contaminants, the improved method for treating the separated alkylation effluent which comprises in combination: passing said alkylation effluent, from which the acid catalyst phase has been removed, through an acid coalescing zone for removal of a major portion of the remaining acid and ester contaminants; washing said refined alkylation effluent in a washing zone with water, under a pressure at which liquid phase conditions are maintained, at a temperature of in the range of from about 120° F. to about 180° F., and with vigorous agitation; separating washed alkylation effluent from said washing zone, passing said washed alkylation effluent at a temperature of from about 90° F. to about 150° F., to a water-coalescer-separator, withdrawing water from said water-coalescer-separator and separately withdrawing purified alkylation effluent from said water-coalescer-separator.

8. In an alkylation process wherein an isoparaffin is reacted with an olefin in the presence of sulfuric acid, the reactor effluent is passed to a separation zone in which the sulfuric acid phase is separated from the hydrocarbon alkylation effluent phase and wherein the separated hydrocarbon alkylation effluent contains a minor proportion of entrained sulfuric acid and sulfate ester contaminants, the improved method for treating the separated alkylation effluent, which comprises in combination: passing said alkylation effluent, from which the sulfuric acid phase has been removed, through an acid coalescing zone to remove a major portion of the remaining contaminants, withdrawing a less contaminated alkylation effluent from said coalescer, washing said alkylation effluent with water, under a pressure at which liquid phase conditions are maintained, at a temperature of from about 120° F. to about 180° F. in a plurality of treating zones with vigorous agitation, separating water from each of said treating zones, and from the alkylation effluent prior to entry of said effluent into the next succeeding treating zone, separately recovering the water-washed alkylation effluent from the last of said treating zones, passing said water-washed alkylation effluent to a water-coalescing zone to separate entrained water from said alkylation effluent at a temperature of between 90° F. and 150° F. and recovering alkylation effluent from said water-coalescer substantially free of entrained contaminants and water.

9. The process of claim 8 in which water separated from the last of said treating zones is neutralized and recycled for admixture with alkylation effluent entering the first of said treating zones.

References Cited in the file of this patent

UNITED STATES PATENTS

| | | |
|---|---|---|
| 2,066,461 | Engs | Jan. 5, 1937 |
| 2,353,500 | Pyzel | July 11, 1944 |
| 2,535,735 | Groebe et al. | Dec. 26, 1950 |
| 2,627,496 | Stratford | Feb. 3, 1953 |
| 2,686,149 | Showalter | Aug. 10, 1954 |
| 2,700,690 | Mottern | Jan. 25, 1955 |
| 2,717,859 | Krause | Sept. 13, 1955 |
| 2,723,945 | Arthurs | Nov. 15, 1955 |
| 2,758,142 | Kemp | Aug. 7, 1956 |
| 2,829,182 | King | Apr. 1, 1958 |

FOREIGN PATENTS

| | | |
|---|---|---|
| 563,142 | Great Britain | Aug. 1, 1944 |

OTHER REFERENCES

Stiles: "Petroleum Refiner," vol. 34, No. 2, Feb. 1955, pages 103–106.